United States Patent
Lonero et al.

[11] Patent Number: 5,806,184
[45] Date of Patent: Sep. 15, 1998

[54] PROCESS TO MANUFACTURE UPPER WORK ROLL PRODUCTS

[75] Inventors: Vincent J. Lonero, Bloomfield Hills; Shawn D. Luteran, Waterford; Mark R. Lathrup, Sterling Heights, all of Mich.

[73] Assignee: Lonero Engineering Company, Inc., Troy, Mich.

[21] Appl. No.: 700,817

[22] Filed: Aug. 21, 1996

[51] Int. Cl.⁶ .................................................. B23P 15/00
[52] U.S. Cl. ................................... 29/895.33; 29/558
[58] Field of Search .............................. 29/895.33, 558, 29/557; 451/49, 51, 62

[56] References Cited

U.S. PATENT DOCUMENTS

| | | | |
|---|---|---|---|
| 1,096,189 | 5/1914 | Norton | 451/51 |
| 4,208,845 | 6/1980 | Sharpe | 451/51 |
| 4,561,276 | 12/1985 | Berstein . | |
| 4,947,668 | 8/1990 | Ostertag . | |
| 5,138,859 | 8/1992 | Winkens . | |
| 5,438,755 | 8/1995 | Giberson | 29/558 |
| 5,445,003 | 8/1995 | Gottschalk et al. . | |
| 5,493,761 | 2/1996 | Bone . | |
| 5,495,738 | 3/1996 | Gottschalk . | |

FOREIGN PATENT DOCUMENTS

| | | | |
|---|---|---|---|
| 61-159362 | 7/1986 | Japan | 451/51 |
| 1504774 | 3/1978 | United Kingdom | 29/895.3 |

*Primary Examiner*—Irene Cuda
*Attorney, Agent, or Firm*—Dinnin & Dunn, P.C.

[57] ABSTRACT

A process for manufacturing an upper work roller for use in the deep rolling of crankshafts including the steps of: rough sawing tool steel to form a generally cylindrical wafer, heat treating said wafer to provide it with a desired hardness, grinding of said wafer to desired dimensions to form a properly dimensioned heat treated blank wafer, a second grinding of said wafer to form a finished shape of work roller, and vibratory finishing said roller to achieve a desired microfinish thereon.

19 Claims, 1 Drawing Sheet

U.S. Patent     Sep. 15, 1998     5,806,184
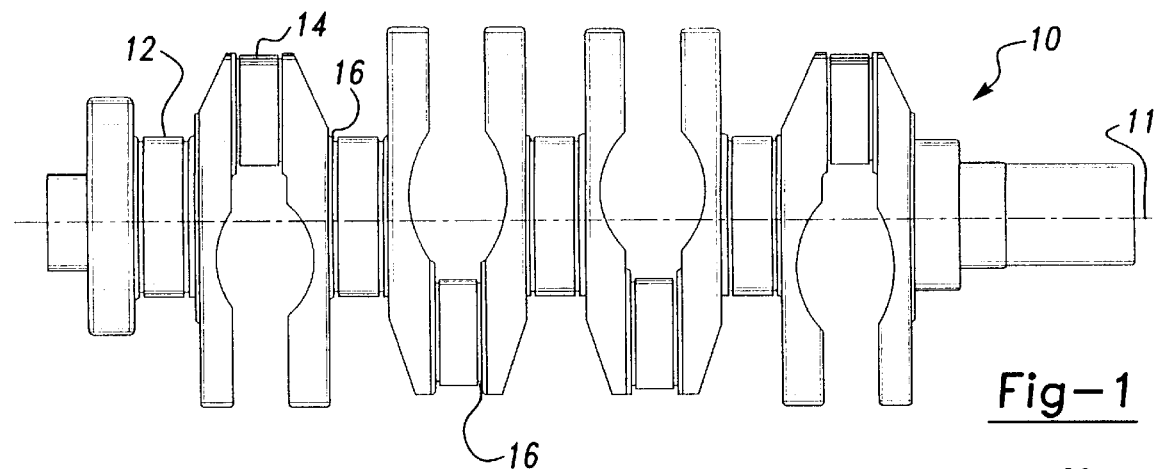
Fig-1
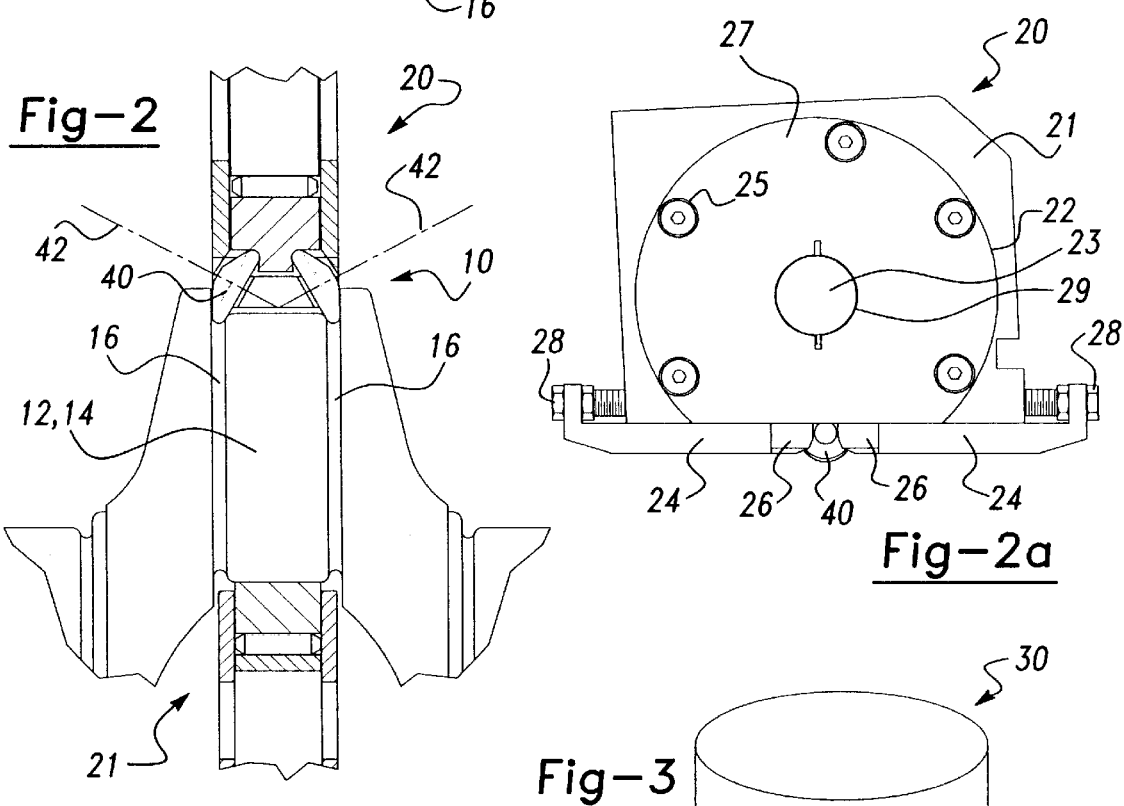
Fig-2
Fig-2a
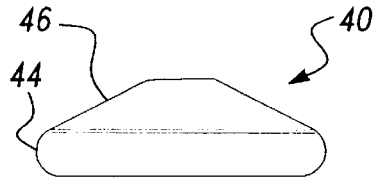
Fig-3
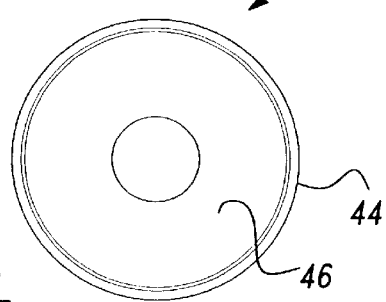
Fig-4a
Fig-4b
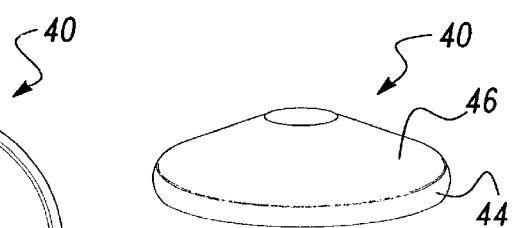
Fig-4c

PROCESS TO MANUFACTURE UPPER WORK ROLL PRODUCTS

FIELD OF THE INVENTION

This invention broadly relates to deep rolling of fillets of engine crankshafts or other annular areas of metallic workpieces subject to high stress loads. More specifically, this invention relates to a new process for manufacturing an upper work roller for use in the deep rolling of crankshafts or like workpieces.

BACKGROUND OF THE INVENTION

The state-of-the-art is indicated by the following cited references: Gottschalk, U.S. Pat. No. 5,495,738; Gottschalk, et al., U.S. Pat. No. 5,445,003; Bone, U.S. Pat. No. 5,493,761; Winkens, U.S. Pat. No. 5,138,859; Berstein, U.S. Pat. No. 4,561,276; and Ostertag, U.S. Pat. No. 4,947,668.

Various machines and methods have been employed to strengthen and finish metal workpieces such as the camshafts and crankshafts for internal combustion engines. In many modern automobiles, engines have been downsized for installation into smaller vehicles. Accordingly, with downsizing of automotive vehicles and their components for reducing weights and improving fuel efficiency, smaller engines and crankshafts are needed. To improve the fatigue strength and durability of downsized crankshafts, deep rolling of fillets and other circular joint areas is increasingly important. Fatigue strength and durability of crank pins and main bearing journals can be significantly increased by deep rolling compressive stresses into the metal of the annular fillets between the pin journals and the adjacent counter weights or balancing webs.

In connection with the process for manufacturing the upper work rollers used in the deep rolling of crankshafts, such work rollers are expensive to produce and the response time to fill an order for such work rollers is quite lengthy. Accordingly, those skilled in the art have long sought an economical and efficient way to produce such work rollers. In the past, there have occurred particular problems in the area of advantageously, economically, and promptly producing such work rollers.

One object of this invention is to provide a novel process for manufacturing work rollers which is economical, and can be carried out promptly and expeditiously from a time saving viewpoint.

Another object of the present invention is to provide a novel process for manufacturing work rollers that is of such versatility to advantageously shorten the response time to an order.

Other objects, features and advantages of the present invention will become apparent from the subsequent description and the appended claims, taken in connection with the accompanying drawings (wherein like numerals indicate like elements).

BRIEF DESCRIPTION OF THE DRAWINGS

FIG. 1 is a side view of an in-line four cylinder crankshaft.

FIG. 2 is a sectional view showing the upper and lower work roller tools engaging a journal of the crankshaft shown in FIG. 1.

FIG. 2a is a side view of the upper work roller tool of FIG. 2.

FIG. 3 is an enlarged plan view of a dimensioned, heat treated blank wafer.

FIG. 4a is an enlarged side view of a finished, shaped work roller.

FIG. 4b is an enlarged top view of the work roller of FIG. 4a.

FIG. 4c is an enlarged plan view of the work roller in FIG. 4a.

SUMMARY OF THE INVENTION

Briefly stated, the present invention comprises a process for manufacturing upper work rollers suitable for deep rolling crankshafts or like workpieces, comprising the steps of rough sawing tool steel to form a generally cylindrical wafer, heat treating said wafer to provide it with a desired hardness, grinding said wafer to form a properly dimensioned heat treated blank wafer for use in forming the roller, a second grinding of said wafer to form a finished shape of a heat treated roller, and vibratory finishing said roller to achieve a desired micro finish thereon.

From another aspect, briefly stated, the invention comprises a process for manufacturing an upper work roller for use in the deep rolling of crankshafts or like products, comprising the steps of: (a) retrieving a previously heat treated and properly dimensioned generally cylindrical wafer from storage; (b) grinding of said wafer to form a finished shape of a heat treated roller; and (c) vibratory finishing said roller to achieve a desired microfinish thereon.

DESCRIPTION OF THE PREFERRED EMBODIMENTS AND BEST MODE OF CARRYING OUT THE INVENTION

Referring now in greater detail to the drawings, FIG. 1 is a side view of a crankshaft 10 with a rotational axis 11 about which the crankshaft 10 will rotate when it is in an engine. The crankshaft 10 rotates about the rotational axis 11 on main bearing journals 12 which are journaled in the engine block. The crankshaft 10 will have a pin journal 14 for each piston of an engine. Each pin journal 14 journals a piston rod (not shown) for a piston.

FIG. 2 is a sectional view of an upper work roller tool 20 and a lower work roller tool 21 engaging and rolling the crankshaft 10 at a journal area 12, 14 to form the laterally spaced annual fillets 16. By directing high forces to each work roller tool 20, 21, high and concentrated rolling forces are translated to the work roller 40. Upon engaging the crankshaft 10 in journal areas 12, 14, the work rollers 40 of the upper work roller tool 20 forms the laterally spaced annular fillets 16. This deep rolling process strengthens the journals 12, 14 of the crankshaft 10 to increase the life of a crankshaft 10 during engine operation.

FIG. 2a is a side view of the upper work roller tool 20. The roller tool 20 comprises a rectangular main body 21 that has been formed to provide an annular recess 22 that receives an annual cover plate 27. The cover plate 27 is secured to the main body 21 by threaded fasteners 28. The main body 21 and cover plate 27 have aligned enlarged annular recesses 29 to receive a cylindrical hub 23.

The roller tool 20 has a pair of L-shaped roller retainers 24 adjustably secured to the lower end of the main body 21 by opposing adjustable threaded fasteners 28. The retainers 24 have inboard ends which are recessed to provide cages 26. When the retainers 24 are secured to the main body 21, the cages 26 support the work rollers 40 for floating rotation generally about upwardly and outwardly an incline axis 42 so that the working circumference 44 of the work rollers 40 extend to the laterally spaced annular fillets 16 of the crankshaft journals 12, 14 being rolled.

FIG. 3 is an enlarged plan view of a dimensioned heat treated blank wafer 30 of a generally cylindrical shape machined from tool steel. Wafers 30 of various dimensions are created to establish a well-stocked collection of such wafers.

FIGS. 4a, 4b and 4c are different enlarged views of a finished shaped work roller 40 with a specified working circumference 44 and an adjacent conical surface 46. The finished work roller 40 is machined from the blank wafer 30.

In accordance with the present invention, an efficient and economical process for manufacturing upper work rollers comprises:

Rough sawing tool steel to form a generally cylindrical wafer.

A preferred embodiment of this invention has the tool steel selected from the group CPM-REX 76, ASP-60 M-2, ASP-60 M-4 or any other similarly composited tool steel.

Heat treating rough sawed wafer to provide it with a desired hardness.

A preferred embodiment of the invention has the heat treating process performed in a vacuum to enhance the heat treating step. Another preferred embodiment of the heat treating step is to achieve a hardness in the range of about 63 to about 70 on a Rockwell C scale.

Grinding said wafer to form a properly dimensioned heat treated blank wafer 30 as in FIG. 3. A preferred embodiment of the invention has a well stocked collection of said wafers 30 having a variety of blank wafers 30 dimensioned to different specifications.

Retrieving a previously heat treated and properly dimensioned generally cylindrical wafer from storage to begin steps for finally shaping wafer 30.

Grinding the retrieved wafer a second time to form a finished shaped roller 40 pursuant to a customer's order. A preferred embodiment of the invention has the second grinding step performed by a CNC (computer numeric controlled) centerless grinding machine.

Vibratory finishing said roller 40 to achieve a desired microfinish thereon.

A preferred embodiment of the invention includes laser etching the finished roller 40 with information regarding identification, material and heat treating hardness.

The technical advantages of the invention herein result in a process for manufacturing work rollers that is substantially more efficient and cost effective than previous methods for manufacturing such work rollers. Previous methods for manufacturing said work rollers performed the heat treating process only after an order was received from a customer. The heat treating process substantially increases the length of time necessary to send out a finished product from the date the order is received. If the heat treating process is performed "in house" the increase in turn around time could be several days. However, if the heat treating process is performed by another company, potentially weeks are lost in processing a finished product.

In accordance with the present invention, the heat treating step is performed before an order is received considerably decreasing the time needed to get the finished product delivered. Upon receiving an order, a heat treated wafer 30 is simply pulled from the stock with the requisite dimension specifications as stated in the order. The wafer is immediately ready for the finishing steps to produce a finished work roller 40. When down time for assembly lines in the automotive business can incur daily figures in the hundreds of thousands of dollars, the significance of decreasing the time period for finishing the product is readily appreciated.

Moreover, the efficiency and cost effective benefits reaped by the customer due to performing the heat treating process before an order is received is also applicable to the manufacturer. The manufacturer performing the heat treating process who is not under the time constraints implicitly incurred from an order will be more efficient in managing his manpower. If manpower is not needed for other duties, they can be used at the manager's discretion and leisure to perform the heat treating process to increase the stock of blank wafers 30.

Under the time constraints of an order, a manager may not have the luxury of efficiently utilizing this manpower. Manpower may have to be pulled from other projects that are in process, or the manpower may have to perform overtime to finish an order in a timely fashion. Clearly, having already performed the heat treating process before an order is received lends itself to efficient use of manpower in the most cost effective manner.

While it will be apparent that the preferred embodiments of the invention disclosed are well calculated to fulfill the objects, benefits and advantages of the invention, it will be appreciated that the invention is susceptible to modification, variation, and change without departing from the proper scope or fair meaning of this adjoined claims.

What is claimed is:

1. A process for manufacturing an upper work roller for use in the deep rolling of crankshafts or like products, comprising the steps of:
   (a) rough sawing tool steel to form a generally cylindrical wafer,
   (b) heat treating said wafer to provide it with a desired hardness,
   (c) grinding said wafer to form a properly dimensioned heat treated blank wafer for use in forming the roller.

2. The process of claim 1 further including the steps of:
   (d) a second grinding of said wafer to form a finished shape of a heat treated roller,
   (e) vibratory finishing said roller to achieve a desired microfinish thereon.

3. The process of claim 2 wherein said finished roller is laser etched with information regarding identification, material and heat treating hardness.

4. The process of claim 2 wherein said second grinding is performed by a CNC centerless grinding machine.

5. The process of claim 1 wherein said heat treating step is carried out in a vacuum.

6. The process of claim 1 wherein said heat treating step is carried out to achieve a hardness in the range of about 63 to about 70 on a Rockwell C Scale.

7. The process of claim 1 wherein said tool steel selected from the group consisting of: CPM-REX 76, ASP-60 M-2, and ASP-60 M-4.

8. A process for manufacturing an upper work roller for use in the deep rolling of crankshafts or like products, comprising the steps of:
   (a) rough sawing tool steel to form a generally cylindrical wafer,
   (b) heat treating said wafer to provide it with a desired hardness,
   (c) grinding of said wafer to desired dimensions to form a properly dimensioned heat treated blank wafer,
   (d) a second grinding of said wafer to form a finished shape of work roller,
   (e) vibratory finishing said roller to achieve a desired microfinish thereon.

9. The process of claim 8 wherein said second grinding is performed by a CNC centerless grinding machine.

10. The process of claim 9 wherein said heat treating step is carried out in a vacuum.

11. The process of claim 8 wherein said heat treating step is carried out to achieve a hardness in the range of about 63 to about 70 on a Rockwell C Scale.

12. The process of claim 8 wherein said tool steel is selected from the group consisting of: CPM-REX 76, ASP-60 M-2, and ASP-60 M-4.

13. A process for manufacturing an upper work roller for use in the deep rolling of crankshafts or like products, comprising the steps of:
   (a) rough sawing tool steel to form a wafer,
   (b) heat treating said wafer to provide it with a desired hardness,
   (c) grinding of said wafer to desired dimensions to form a properly dimensioned heat treated blank wafer,
   (d) a second grinding of said wafer to form a finished shape of work roller, and wherein, said heat treating step is carried out to achieve a hardness in the range of about 65 to about 67 on a Rockwell C Scale,
   and said second grinding step is performed by a CNC centerless grinding machine.

14. A process for manufacturing an upper work roller for use in the deep rolling of crankshafts or like products, comprising the steps of:
   (a) retrieving a previously heat treated and properly dimensioned generally cylindrical wafer from storage,
   (b) grinding of said wafer to form a finished shape of a heat treated roller,
   (c) vibratory finishing said roller to achieve a desired microfinish thereon.

15. The process of claim 14 wherein said grinding is performed by a CNC centerless grinding machine.

16. The process of claim 15 wherein said heat treating step is carried out in a vacuum.

17. The process of claim 16 wherein said heat treating step is carried out to achieve a hardness in the range of about 63 to about 70 on a Rockwell C Scale.

18. The process of claim 17 wherein said tool steel is selected from the group consisting of: CPM-REX 76, ASP-60 M-2, and ASP-60 M-4.

19. The process of claim 18 wherein said finished roller is laser etched with information regarding identification, material and heat treating hardness.

* * * * *